Figure 1:
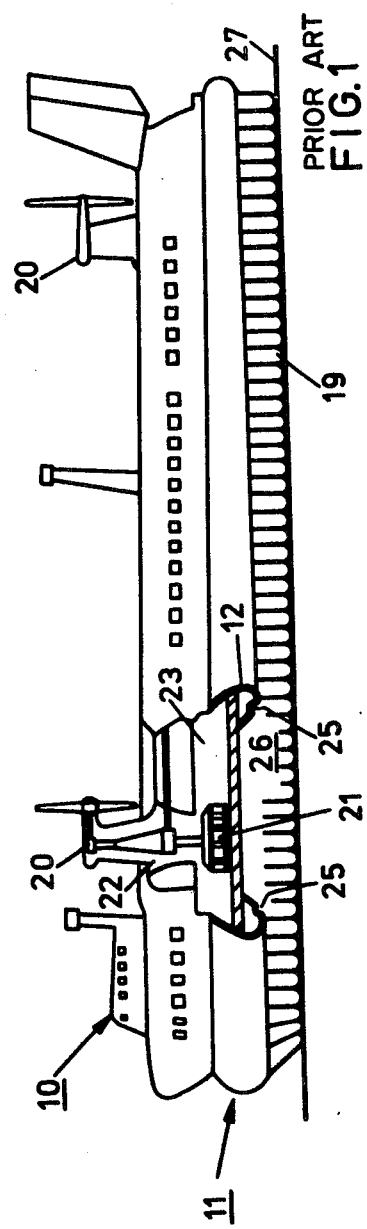

United States Patent [19]

Wheeler

[11] 4,131,175

[45] Dec. 26, 1978

[54] AIR CUSHION VEHICLES

[75] Inventor: Raymond L. Wheeler, Cowes, England

[73] Assignee: British Hovercraft Corporation Ltd., Yeovil, England

[21] Appl. No.: 720,350

[22] Filed: Jun. 16, 1976

[30] Foreign Application Priority Data

Jun. 20, 1975 [GB] United Kingdom ............... 26413/75

[51] Int. Cl.² ............................................... B60V 1/16
[52] U.S. Cl. ..................................................... 180/127
[58] Field of Search ............... 180/128, 127, 121, 116, 180/117, 118, 120, 122, 123, 124

[56] References Cited

U.S. PATENT DOCUMENTS

| 3,244,248 | 4/1966 | Prickett | 180/127 |
| 3,536,156 | 10/1970 | Crago | 180/128 |
| 3,618,695 | 11/1971 | Wheeler | 180/128 |
| 3,643,758 | 2/1972 | Winter | 180/128 |
| 3,918,548 | 11/1975 | Dyke | 180/128 |
| 3,966,012 | 6/1976 | Crewe | 180/127 |
| 3,987,865 | 10/1976 | Krupp | 180/127 |

FOREIGN PATENT DOCUMENTS 1127982 9/1968 United Kingdom ..................... 180/128

*Primary Examiner*—Kenneth H. Betts
*Attorney, Agent, or Firm*—Larson, Taylor and Hinds

[57] ABSTRACT

An air cushion vehicle is provided with cushion-containing means at least partly constituted by a flexible skirt which comprises an inflatable bag member and individual flexible skirt elements depending downwardly from attachment both to the bag member and the vehicle hard structure. The bag member is attached to the vehicle hard structure along fixing lines positioned one above the other, so that in operation of the vehicle when the bag member is inflated it projects substantially outboard of the fixing lines, and the lower tips of the individual skirt elements are positioned at least outboard of a vertical plane passing through the lower fixing line, whereby when the lower tips of the individual skirt elements contact obstructions or discontinuities in a surface over which the vehicle is operating, the skirt responds to move bodily upwardly, thereby moving the lower tips of the individual skirt elements in an upward and preferably outward direction with respect to the fixing lines of the bag member to the vehicle hard structure.

6 Claims, 4 Drawing Figures

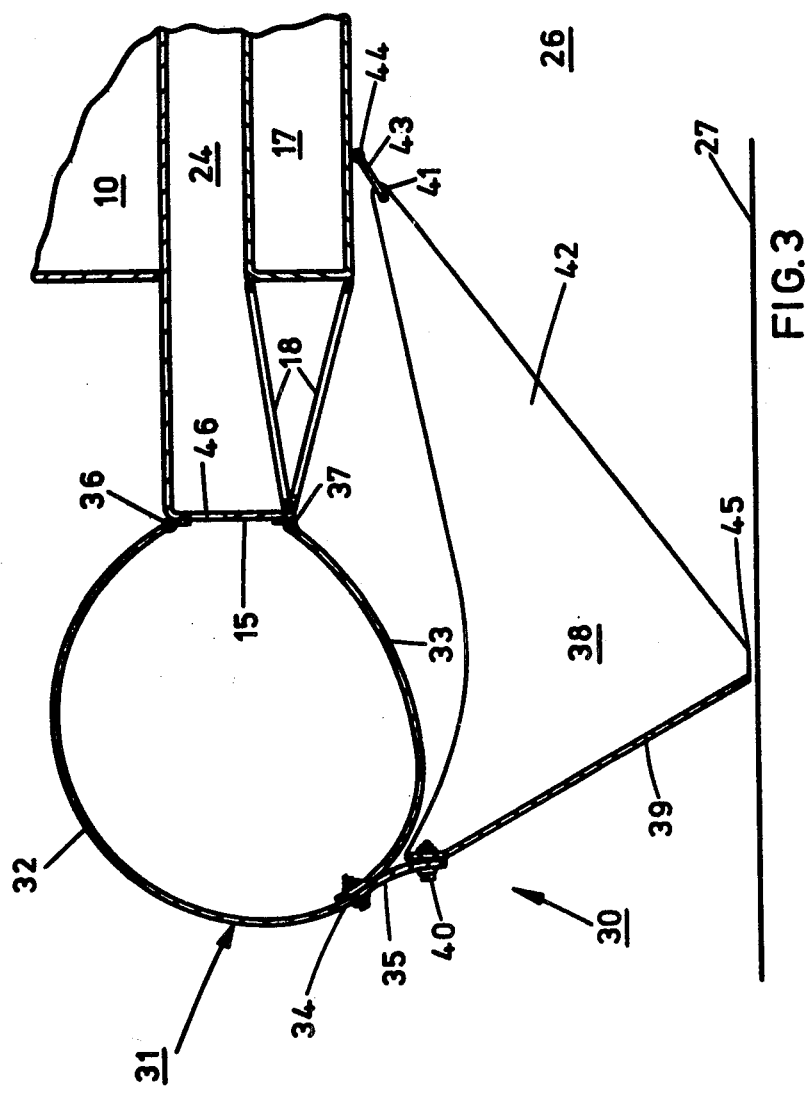

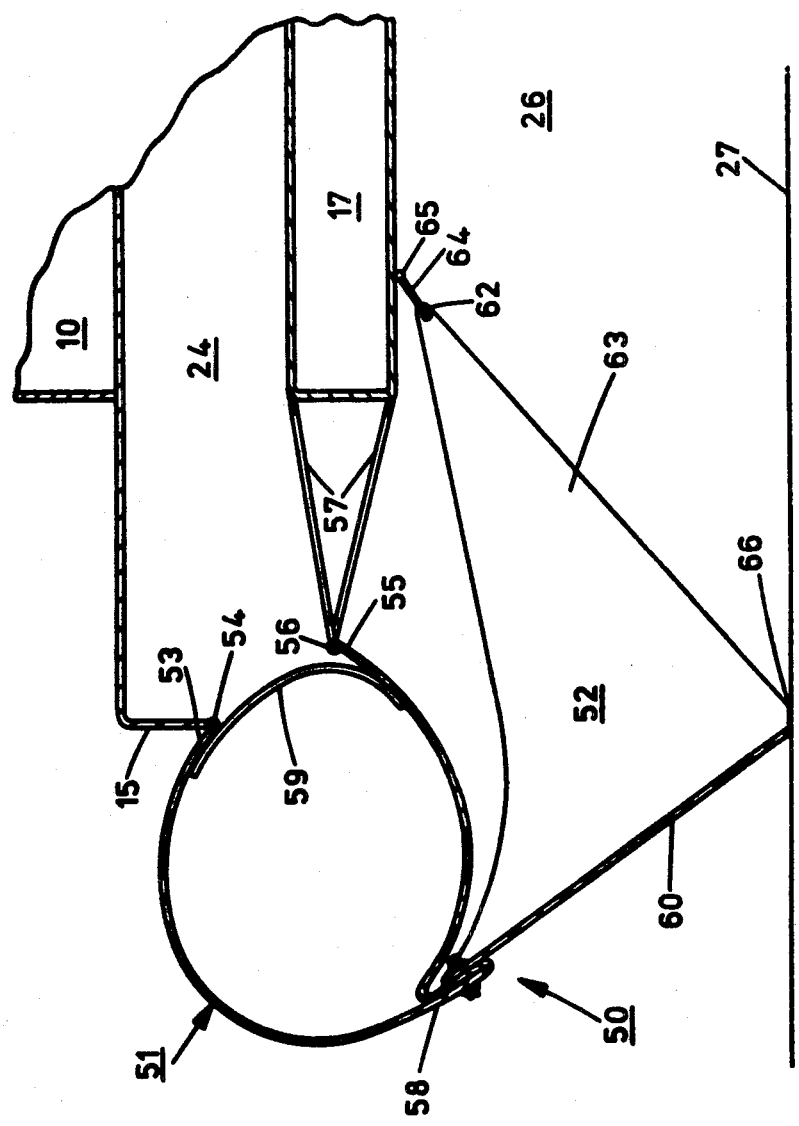

AIR CUSHION VEHICLES

This invention concerns air cushion vehicles, and is especially concerned with air cushion vehicles having flexible cushion-containing skirts.

Air cushion vehicles may be fully skirted or may be of the sidewall type in which cushion containment is effected partly by rigid sidewalls. While the invention is applicable to both types of vehicle it is most beneficial in connection with the fully skirted type of vehicle and will, therefore, be discussed and described in connection therewith.

The objective of fitting an air cushion vehicle with a flexible cushion-containing skirt is to enable a required operating height or clearance between the hard structure of the vehicle and the terrain over which the vehicle is to operate to be obtained with minimum power requirements to provide and maintain the cushion. The greater the operating height the greater may be the terrain irregularities over which the vehicle may be safely operated without risk of terrain impact on the hard structure of the vehicle. Although adequate operating height is of particular importance in the case of an amphibious vehicle when operating overland, it is also important in the case of a marine vehicle because a large operating height provides rough sea operating capability and enables the vehicle to operate at higher speeds and with greater passenger comfort and less liability of structural damage than a vehicle with a smaller operating height.

Therefore, development of the flexible skirt has been aimed at maximising operating height with minimum utilisation of power to provide and maintain the cushion so as to enable air cushion vehicles so equipped to operate safely in rough seas and at high speeds. For efficiency of cushion containment, the lower edge or hemline of a flexible skirt must readily conform with terrain variations so as at all times to achieve an effective seal to minimize the escape of cushion air under the skirt. A conflicting requirement is, however, that the skirt be stiff and distortion-resistant so as to maintain its desired configuration under operating loading. These conflicting requirements have been met by the two-part skirt configuration, the upper part of the skirt being formed as an inflatable bag that is stiffened by being inflated, while the lower part of the skirt is formed by a plurality of adjacent and independent flexible skirt elements known in the art as segments or "fingers."

British Pat. No. 1,127,982 and U.S. Pat. No. 3,536,156, for example, describe flexible skirts of this "bag and fingers" configuration. As described in these Patents, the inflatable bag may be suitably apertured to permit the air with which it is inflated to escape in a controlled manner into the cushion area and, in particular, into the vicinity of the fingers so as to accomplish an inflation and stiffening of these to a required degree. Alternatively, the bag may be of the no-flow type and apart from small drain holes being substantially sealed with connections only for the source of inflation air, so that it may be maintained inflated to the desired internal pressure with only sufficient flow of air into the bag to make up for losses through the drain holes and for the inevitable leakages that occur in a practical construction. The no-flow bag configuration has the advantage of a low demand for power during operation, and may conveniently be combined with air pressure generating arrangements that provide both a small output at a relatively high pressure suitable for inflating the bag, and a large output at the lower pressure required for supplying air to the cushion area continually to replenish the losses of cushion air.

When a skirted air cushion vehicle operates at high speed in heavy seas, wave impact on the skirt imposes very heavy loads on the latter and a particular problem is that known as "tuck-under" that is associated with plough-in conditions, the skirt tending to be bodily deflected underneath the hard structure of the vehicle so as to lose its proper configuration and, most importantly, to reduce and alter the shape of the cushion area under the vehicle in a sense to aggravate the plough-in condition by reducing cushion lift at the region where skirt tuck-under has occurred. The problem of tuck-under is most acute in the bow region of the vehicle, and for this reason may be exhibited by the bow skirts of sidewall vehicles.

It is an object of the present invention to provide a skirt configuration that is better suited to meet the requirements of large and high speed seagoing air cushion vehicles than skirt constructions and configurations hitherto proposed and used.

It is another object of the present invention to provide a skirt configuration that substantially avoids the tuck-under problem discussed above.

It is a further object of the present invention to provide a skirt configuration having a better ability than skirt constructions and configurations hitherto proposed and used to respond to changes in the profile of the surface that it is moving over.

In its broadest aspect the present invention provides an air cushion vehicle having cushion-containing means at least partly constituted by a flexible skirt comprising an inflatable bag member and dependent individual flexible skirt elements, the bag member being substantially sealed against loss of inflation air in operation and being fixed to the vehicle hard structure along fixing lines that are spaced apart and one of which is situated at a level above the other so that the inflatable section of the bag member is situated substantially wholly outboard of at least the lower one of these fixing lines, each dependent individual skirt element being attached both to the bag member and to the underside of the vehicle hard structure so as to depend downwardly, terminating at a lower tip that is outboard of a vertical plane passing through at least the lower fixing line of the bag member.

In preferred constructions of the invention the flexible skirt responds to move bodily upwardly when the dependent individual skirt elements contact obstructions or discontinuities in a surface over which the vehicle is operating, thereby moving the lower tips of the dependent individual skirt elements in an upward and preferably outward direction with respect to the fixing lines of the bag member to the vehicle and hard structure.

Preferably, the dependent individual flexible skirt elements are of the type known in the art as segments or "fingers."

The fixing lines are preferably so disposed that one is above the other, and perhaps slightly outboard thereof, whereby the majority of the inflatable section of the bag is outboard of both fixing lines.

With this preferred fixing line disposition the inflatable section of the bag projects mainly outwardly of the hard structure in the vicinity of the fixing lines so that the possiblity of the bag being distorted into a tuck-under configuration is substantially prevented, deflection of the bag under heavy loading, for instance as a result of plough-in conditions, tending to occur mainly upwardly of the vehicle hard structure, thereby avoiding significant inboard movement of the skirt hemline and consequent inboard shift of the local cushion lift.

In the case of a vehicle having its cushion containment entirely provided by a skirt of the aforesaid configuration the cushion planform area defined by the skirt may be made to exceed the hard structure planform area of the vehicle, and thus provide the desired operating height and vehicle lift capability with a lower cushion pressure than in the case of a vehicle having a cushion planform area restricted to that of the vehicle hard stucture. This feature in turn lessens the power demand for maintaining the cushion.

By suitable choices of geometry — i.e. fixing line position and separation relative to the bag dimensions and configuration, and finger size, configuration and location on the bag — and bag inflation and cushion pressures, a skirt having relatively large depth (to give a large operating height) with good resistance to distortion coupled with good conformation of its hemline to local terrain variations may be constructed and meet the arduous operational requirements of large, high speed, air cushion vehicles that are to operate in rough seas.

However, while the invention is especially applicable to large, high speed, air cushion vehicles it is also applicable with advantage to smaller vehicles. Thus, because the skirt arrangement that characterises the invention provides a very stable skirt with lower power requirements for maintaining the inflation of the bag part of the skirt, and low losses of cushion air, the total lift power requirements of the vehicle are low in comparison with vehicles having conventional skirts under any given operating conditions. For this reason a vehicle in accordance with the invention will in general be able under any given operating conditions to apply a greater proportion of its total installed lift and propulsion power capacity to the propulsive function than the conventionally skirted equivalent vehicle.

Moreover, because of its stability the skirt of the vehicle in accordance with the invention will ususally give rise to less drag than a conventional skirt under equivalent conditions, so that the vehicle of the invention will usually be more economical in operation than the conventionally-skirted equivalent vehicle.

Usually the bag of the skirt of a vehicle in accordance with the invention will be inflated to a pressure greater than the cushion pressure. While a common source(s) may provide both bag inflation and cushion air, relying on duct losses and the like to restrict the cushion air pressure in comparison with the bag inflation pressure that will correspond substantially with the source pressure, preferably the bag is adapted to be inflated by a source or sources of inflation air having an output characteristic suited to the requirements of the bag and separate from the source or sources of cushion air that may thus be specifically adapted to meet the cushion air requirements without being compromised by having to produce a supply for the bag.

Conveniently the sources for both bag inflation air and cushion air are suitably designed fan units and if desired fan units having outputs suitable as bag inflation and cushion air respectively may be arranged in tandem on a common driving shaft. Alternatively, a bleed of cushion air may be boosted to higher pressure for bag inflation purposes by a suitable compressor or fan unit taking a feed from the cushion or from a source of cushion air.

The bag may if desired be divided into sections connected to individual inflation air sources with, preferably, directional flow valves between adjacent sections to enable pressure equalisation to occur and to ensure maintenance of bag inflation in the event of an individual inflation air source failure, while restricting collapse of the bag in the case of damage to a section thereof.

When the dependent flexible skirt elements are in the form of segments or "fingers" as is preferred, these fingers may be of conventional form but preferably are more splayed than conventional fingers, in order to have greater resistance to distortion. By reason of the bag geometry and attachment characteristic of the invention, the bag provides good support for fingers and as a consequence finger depths up to 60% greater than normal, with the fingers having a depth equivalent to 60–80% of the operating height (as compared with not more than about 50% in conventional skirt constructions) may be utilised with adequate control of finger deflection characteristics.

Although the bag, being of the no-flow type and therefore requiring minimal supplies of air when once inflated, may be fed with inflation air at one or a few points to suit the bag inflation air source(s) and the location thereof, it will usually be desirable for cushion air to be fed to the cushion near to the skirt and over most of the peripheral length thereof to ensure prompt reinflation and shape restoration of the fingers or other dependent skirt elements following any distortion thereof as a result of terrain or wave impact.

Thus, preferably cushion air is fed to the cushion area via a plenum chamber having a peripheral outlet that is substantially coextensive with the inboard perimeter of the bag and is outboard of the inboard attachments of the fingers.

Figure 2:
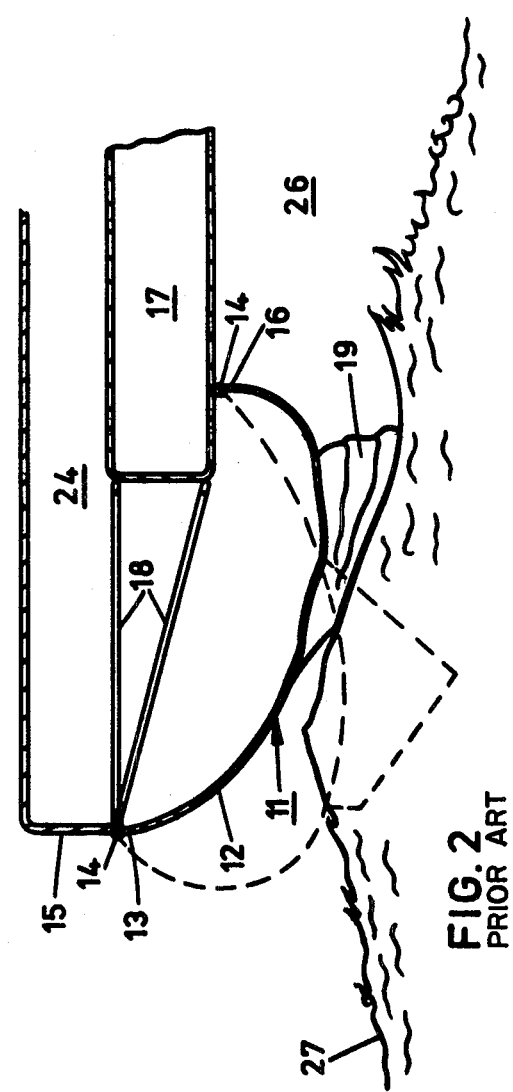

The invention will now be further described, by way of example only, and with reference to the accompanying drawings, in which:

FIG. 1 shows an air cushion vehicle having a known form of flexible skirt assembly, FIG. 2 is a cross-section through the known form of flexible skirt assembly, FIG. 3 is a cross-section through a flexible skirt assembly in accordance with one embodiment of the present invention, and FIG. 4 is a cross-section through a flexible skirt assembly in accordance with another embodiment of the present invention.

An air cushion vehicle 10 having an all-up weight in the range 270 to 320 tons, and intended to operate with a minimum operating height of 10 feet (12 to 14 feet at the bow) with a cushion pressure of 50 to 60 lbs. per square foot, is shown in FIG. 1 fitted with a known form of flexible skirt assembly 11. The skirt assembly 11, also shown in transverse cross-section in FIG. 2, comprises a bag member 12 manufactured from flexible impermeable sheet material having one edge 13 attached by hinge fastening devices 14 of the construction disclosed in U.S. Pat. No. 3,244,248 to the side structure 15 of the vehicle 10, and having an opposed edge 16 attached by similar hinge devices 14 to the underside of the buoyancy tank structure 17 of the vehicle 10. The side structure 15 is supported from the buoyancy tank 17 by tubular struts 18. A plurality of dependent individual flexible skirt elements 19 of the type known in the art as fingers or segments are attached to the bag member 12 so as to depend downwardly therefrom.

The vehicle 10 has four integrated lift fan-propulsion propeller assemblies 20, driven by engines (not shown), only two of these assemblies 20 being visible in FIG. 1. The vehicle is shown in part section at the position of one of the assemblies 20 so as to reveal the lift fan 21 that when rotated draws in air through an intake duct 22. Air pressurized by the fan 21 flows into a plenum chamber 23 formed within the rigid structure of the vehicle 11, and then by way of peripherally extending ducts 24 (FIG. 2) to the bag member 12. Some of this pressurized air flows by way of holes 25 in the bag member 12 to build up and sustain a cushion of pressurized air 26 between the underside of the vehicle 10 and the surface 27 above which it is supported. The total cross-section area of the holes 25 in the bag member 12 is such as to give a pressure drop between the air inflating the bag member 12 and the air forming the cushion 26. With this form of skirt assembly 11 the pressure of the air inflating the bag member 12 is generally in the order of 1.5 to 2 times the pressure of the air forming the cushion 26. As there must be a continuous flow of air from the bag member 12 to replenish cushion losses, the pressure in the bag member must be higher than the cushion pressure. This difference in pressure associated with the flow constitutes a significant power loss, since to a first order, pressure losses are proportional to flow volume squared and associated power losses therefore proportional to flow volume cubed.

A typical cross-section profile of the known bag and finger skirt 11 when deflected by a wave as the vehicle is operating over water is illustrated in FIG. 2. The original profile of the skirt is shown in broken line. It can be seen that the skirt is being deflected under the vehicle, thus distorting the cushion area. Furthermore, if the impact force is high enough, air in the bag member 12 will be forced back along the duct 24, past the fan 21 and out through the intake duct 22. The bag, thus deflated, will then collapse against the underside of the buoyancy tank 17 giving rise to the condition known as tuck-under.

A transverse cross-section through one form of flexible cushion-containing skirt 30 in accordance with the present invention, is illustrated in FIG. 3 attached to rigid structure of an air cushion vehicle 10 not illustrated in full but being similar to that shown in FIG. 1. The skirt 30 includes a bag member 31 manufactured from flexible sheet material, such as, for example, rubber impregnated nylon cloth, and in this embodiment comprises, in transverse cross-section, two sheets 32 and 33 respectively, joined in overlapping relationship by an airtight bonded and bolted joint 34 so that a portion of the sheet 32 extends downwardly from the joint 34 to form an apron 35. The sheet 32 is attached along a hinged fixing line 36 by hinge fastening devices of the construction disclosed in U.S. Pat. No. 3,244,248 to side structure 15 of the vehicle, and the other sheet 33 is similarly attached along a hinged fixing line 37 to the side structure 15 so as to be spaced below the hinge line 36.

The lower part of the skirt 30 is formed by a plurality of dependent individual flexible skirt elements 38 of the type known in the art as segments or "fingers." Each such element 38 is attached at an upper part of an outer wall 39 by a bolted joint 40 to the apron 35 of the bag member 31. The innermost corner 41 of each web 42 of the element 38 is attached by a pivotal link 43 to the underside of the buoyancy tank 17 along a hinged fixing line 44. The element 38 depends downwardly from these attachments to the bag member and the buoyancy tank so as to terminate at a lower tip portion 45 that is positioned outboard of a vertical plane passing through the fixing lines 36 and 37 respectively.

In operation of the vehicle, pressurized air from the lift fans (not shown in FIG. 3) flows from the peripherally extending duct 24 downwardly between the buoyancy tank 17 and the side structure 15 to build up and maintain the cushion 26 on which the vehicle 10 is supported above the surface 27. This flow of pressurized air to the cushion 26 also serves to inflate the independent flexible skirt elements 38 into their operational configuration. At the end of those parts of the peripherally extending duct 24 that are opposite to each lift fan, one or more holes 46 are provided in the side structure 15 to permit some of the pressurized air supplied by the lift fans to pass into the space enclosed by the bag member 31 and the side structure 15 so as to inflate the bag member 31 outwardly with respect to the structure 15. These holes 46 are of a number and diameter such as to allow the necessary flow of air to give the required inflation pressure for the bag member 31.

A flexible cushion-containing skirt 50 in another embodiment of the present invention is shown in FIG. 4 attached to an air cushion vehicle 10, not illustrated in full. The skirt 50 comprises a bag member 51 and a plurality of dependent individual flexible skirt elements 52 of the type known as segments or fingers. In this embodiment the bag member 51 comprises, in transverse cross-section, a sheet of flexible impermeable material, such as rubber impregnated nylon cloth, having an edge 53 attached by hinge fastening devices of the construction disclosed in U.S. Pat. No. 3,244,248 to side structure 15 of the vehicle 11 along a hinge fixing line 54. The opposite edge 55 of the sheet is attached by similar hinge devices along a hinge fixing line 56 that is supported in spaced relationship from the side of the vehicle buoyancy tank 17 by tubular struts 57 so as to be spaced downwardly from and inboard of the hinge fixing line 54. Intermediate the edges 53 and 55 the sheet of material is folded back on itself and fastened by bonding or stitching to form an apron 58. Lengths of flexible impermeable sheet material 59 are bonded adjacent to the edges 53 and 55 so as to extend across the space between the hinge fixing lines 54 and 56 and substantially close the bag member 51. However, in the area of those parts of the peripherally extending duct that are opposite to each lift fan (not shown in FIG. 4), a spacing is provided between the sheet 59 to permit pressurized air flowing from the fan through the duct 24 to enter the bag member 51 and provide inflation thereof. The remainder of the pressurized air flowing in the duct 24 passes downwardly between the bag member 51 and the buoyancy tank 17 to build up and sustain the cushion 26 of pressurized air supporting the vehicle 11 above the surface 27.

Each of the dependent individual skirt elements 52 is attached to the apron 58 at the upper part of an outer wall 60 of the element by a bolted joint 61. The innermost corner 62 of each web 63 of the element 52 is attached by a pivotal link 64 to the underside of the buoyancy tank 17 along a hinge fixing line 65. The element 52 depends downwardly from these attachments to the bag member and the buoyancy tank so as to terminate at a lower tip portion 66 that is spaced outboard of a vertical plane passing through the inner hinge fixing line 56 of the bag member 51.

In operation of an air cushion vehicle having a cushion-containing skirt in accordance with the present invention, the pressurized air flowing from the lift fans to the cushion does not pass through the bag member of the skirt. Thus there is no loss of air from the bag member to replenish cushion air losses, and the power losses associated with the pressure drop between the air inflating the bag member and the cushion air in the prior art skirt arrangement are substantially eliminated.

The inflatable section of the bag member of the cushion-containing skirt hereinbefore described with reference to and shown in FIG. 3 of the accompanying drawings is wholly outboard of the hinge fixing lines of the bag member to the vehicle hard structure. Similarly, the inflatable section of the bag member of the cushion-containing skirt hereinbefore described with reference to and shown in FIG. 4 of the accompanying drawings is wholly outboard of the inner hinge fixing line and the majority of the inflatable section of the bag is outboard of the outer hinge fixing line. In the event of the bag member of a cushion-containing skirt in accordance with the present invention making contact with a wave when the vehicle is operating over water, the bag member will not be forced under the vehicle into a collapsed condition, but will ride over the wave by pivoting upwardly about the hinge fixing lines on the vehicle. Thus the skirt tuck-under problem is substantially overcome.

Another feature of the present invention is that the lower tips of the dependent individual skirt elements, such as fingers or segments, are positioned outboard of at least the inner hinge fixing line of the bag member. Loads applied at the lower tip of the elements, when they contact surface obstructions, exert a turning moment about at least one of the hinge fixing lines of the bag member that acts to pivot it upwardly about the hinge fixing lines. In pivoting upwardly the bag member lifts the individual skirt elements clear of the surface obstructions, thereby substantially preventing knuckling or collapsing of the individual skirt elements. Thus a skirt assembly in accordance with the present invention has good response characteristics, with good ability to follow the water wave profile without too much immersion in the water, and thereby minimising the water wetting and overwave increments of the hydrodynamic resistance of the skirt.

Of course, the embodiments of the invention hereinbefore described with reference to and as shown in FIGS. 3 and 4 of the accompanying drawings are by way of example only, modifications being possible without departing from the scope of the invention. For instance, the dependent individual flexible skirt elements may be of the type known in the art as cones. Moreover, the pressurized air inflating the bag member may be provided by a source separate from that feeding the cushion.

The characteristics of a skirt in accordance with the present invention will be governed to a large extent by the inflation pressure of the bag member, and by the skirt geometry, in particular the pitch of the bag member hinge fixing lines, the angle of a line joining these hinge fixing lines to the vertical, and the position of the lower tips of the individual skirt elements with respect to the hinge fixing lines. Therefore, the geometry of skirt assemblies in accordance with the invention is not limited by the configuration shown in FIGS. 3 and 4 of the accompanying drawings.

I claim as my invention:

1. An air cushion vehicle having cushion-containing means at least partly constituted by a flexible skirt comprising an inflatable bag member constructed from impermeable flexible sheet material fixed to the vehicle hard structure along fixing lines that are spaced apart and one of which is situated at a level above the other whereby in operation when the bag member is inflated the major portion of the inflated section of the bag member is situated outboard of a vertical plane through the upper fixing line and there is no flow of air through the bag member to build up and sustain the vehicle supporting cushion, and a plurality of individual skirt elements, each element extending between attachment at a fixing line on the bag member and attachment at a fixing line on the underside of the vehicle hard structure so as to depend downwardly therefrom and terminate at a lower tip that is outboard of a vertical plane passing through at least the lower fixing line of the bag member to the vehicle hard structure, the dimension measured between the fixing lines of the skirt elements on the bag member and the vehicle hard structure being substantially larger than the dimension measured between the fixing lines of the bag member to the vehicle hard structure.

2. An air cushion vehicle as claimed in claim 1, wherein the fixing lines of the bag member are so disposed that one is above the other on a common vertical plane, whereby the whole of the inflatable section of the bag member is outboard of both fixing lines of the bag member.

3. An air cushion vehicle as claimed in claim 1, wherein the dependent individual flexible skirt elements are of the type known in the art as segments or fingers.

4. An air cushion vehicle as claimed in claim 1, wherein the lowermost tip of each dependent individual skirt element is spaced outboard of both of the fixing lines.

5. An air cushion vehicle as claimed in claim 1, wherein both bag member inflation and cushion air are provided by a common source.

6. An air cushion vehicle as claimed in claim 5, wherein cushion air is fed to the cushion area via a plenum chamber and a peripherally extending duct having an outlet that is substantially coextensive with the inboard perimeter of the bag member and is outboard of the inboard attachments of the dependent individual skirt elements.

* * * * *